United States Patent

Swillinger

[15] 3,653,868
[45] Apr. 4, 1972

[54] WATER FENCE SUPPORT IN FLOAT GLASS APPARATUS

[72] Inventor: Francis L. Swillinger, Perrysburg, Ohio

[73] Assignee: Libbey-Owens-Ford Company, Toledo, Ohio

[22] Filed: Feb. 25, 1970

[21] Appl. No.: 14,001

[52] U.S. Cl. ................................. 65/182 R, 65/99 A, 65/91, 65/201
[51] Int. Cl. ........................................................ C03b 18/02
[58] Field of Search ........................ 65/99 A, 182 R, 91, 201

[56] References Cited

UNITED STATES PATENTS 3,223,509  12/1965  Barradell-Smith et al. ............... 65/182
3,107,162  10/1963  Nyquist et al. ........................... 65/201

*Primary Examiner*—Arthur D. Kellogg
*Attorney*—Collins and Oberlin

[57] ABSTRACT

A device for externally supporting the outer end of a pivotally mounted water fence in a float glass apparatus so as to provide three dimensional adjustment of the operating portion of the fence. An outwardly extending telescoping member is secured to the tank structure to provide support and axial or in and out adjustment. A vertical telescoping member secured to the outboard end thereof permits the fence to pivot vertically about the entry point through the bath side wall. The outer end of the fence is clamped between spaced horizontal members atop the vertical telescoping member in a manner which provides for adjustment therealong to accomplish horizontal pivotal adjustment of the fence.

4 Claims, 5 Drawing Figures

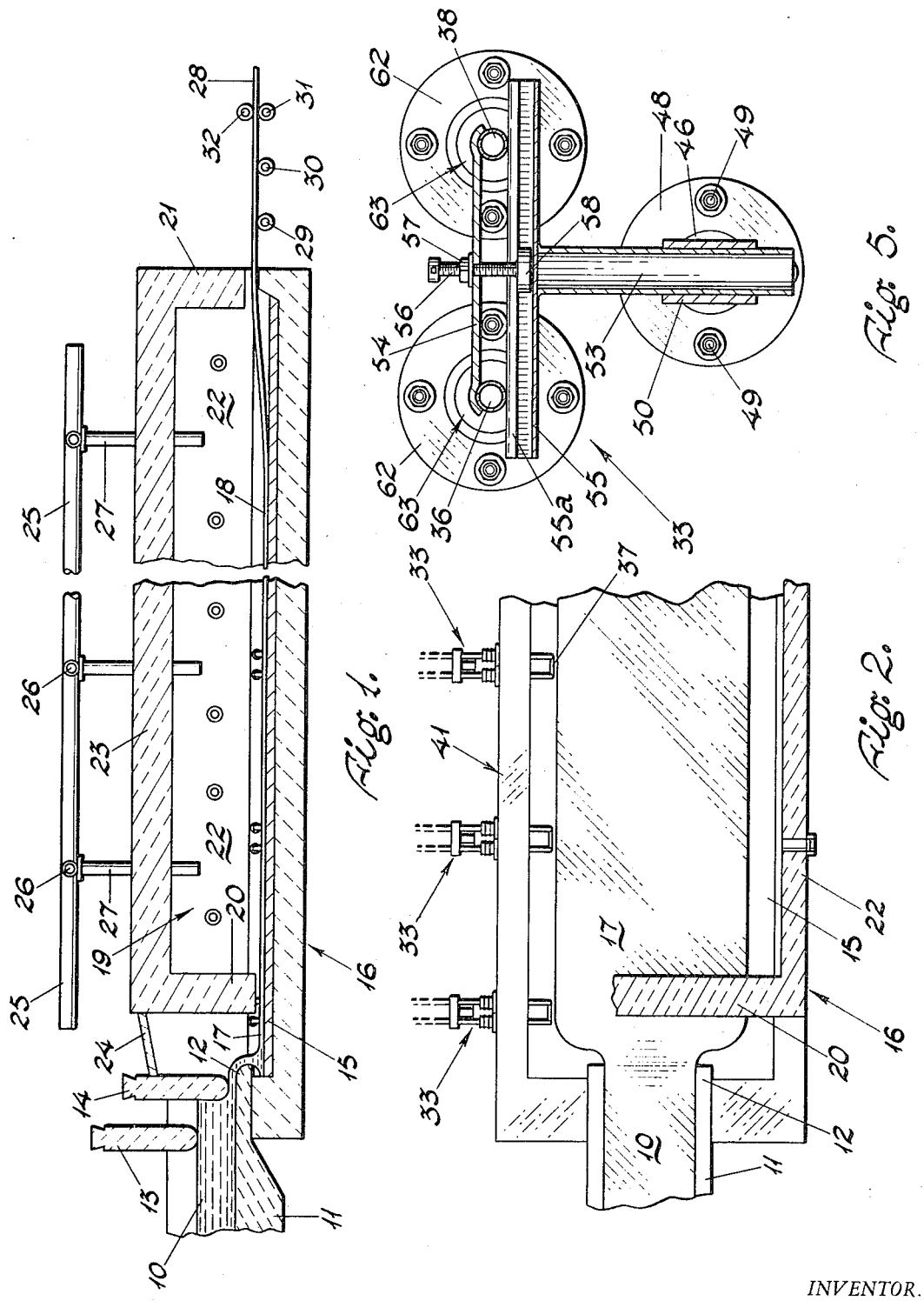

INVENTOR.
Francis L. Swillinger
BY
Collins & Oberlin
ATTORNEYS

WATER FENCE SUPPORT IN FLOAT GLASS APPARATUS

BACKGROUND OF THE INVENTION

1. Field of the Invention

The present invention relates broadly to the manufacture of flat glass by the float process, and more particularly to an improved method and apparatus for externally, adjustably supporting a water fence used therein.

2. Description of the Prior Art

A representative type of float glass producing apparatus is illustrated and described in U.S. Pat. No. 3,083,551. As therein explained, the manufacture of flat glass by the float process involves delivering molten glass at a controlled rate onto a bath of molten metal which has a greater density than that of glass (such as tin or alloys of tin, for example) and advancing it along the surface of the bath under physical and thermal conditions which assure (1) that a layer of molten glass will be established on the bath, (2) that the glass in the layer can flow laterally to develop on the surface of the bath a buoyant body of molten glass of stable thickness, and (3) that the buoyant body in ribbon form will be continuously advanced along the bath and sufficiently cooled as it advances to permit it to be taken unharmed from the bath by mechanical conveying means.

Above the float bath of molten metal, an enclosed head space or plenum chamber is provided to contain the so-called float atmosphere. This atmosphere is generally a non-oxidizing gas (usually a mixture of gases such as nitrogen and hydrogen) maintained under sufficient pressure to prevent contamination by leakage into the head space.

Such an apparatus will produce an ultimate ribbon of a thickness essentially the same as the stable or equilibrium thickness of the buoyant body; but a thinner ultimate ribbon may be produced by increasing the speed of the mechanical conveying means that removes the ribbon from the molten bath, thereby increasing the tractional effort and attenuating the glass body of stable thickness as it is advanced along the bath.

For successful operation of the float process, it has been found desirable to guide or steer the ribbon as it moves along the length of the bath. This has been achieved by locating a plurality of so-called water fences adjacent one edge of the ribbon. Typically, each water fence comprises a continuous length of tube bent on itself in the manner of a hairpin which is inserted through and horizontally supported from one side of the bath structure. The closed end or cooling segment is bent down such that under normal conditions it is immersed in the molten metal bath, and the sides extend through the tank sidewall to provide the inlet and outlet legs by means of which a liquid cooling medium is circulated through the tube. Convection currents developed within the molten metal bath by the cooling effect of the water fences tend to draw the ribbon toward the fence and impart lateral displacement to the floating ribbon of glass whereby one edge thereof may be caused to travel along the bath in contact with the fence or other edge guide means. If desired, water fences may be installed in the bath on both sides of the glass ribbon using the same effect to steer it therebetween.

In the prior art, maintenance of the water fences in operative position relative to the molten metal bath has been accomplished by means of vertically adjustable mounting and support means located without the tank. Thus, ordinary plumbers stands resting upon the adjacent building floor have conventionally been used to support the outer end of water fences and thereby maintain the cooling portion thereof in operative position in the molten metal. U.S. Pat. No. 3,223,503, issued Dec. 14, 1965, illustrates and describes another device intended for this purpose.

With the prior art structures, however, horizontal adjustment was limited at best to advancing and retracting the water fences in an axial direction. Thus, these support structures were objectionable in that, once installed, longitudinal adjustment within the bath was not possible, and an amount of such adjustment is desirable to compensate for inequalities in the steering effect which may occur along the bath.

SUMMARY OF THE INVENTION

According to the present invention, there is provided a mounting and support means which allows lateral as well as vertical and axial adjustment of the water fence, thereby permitting improved flexibility of control over the effects of the convection currents within the molten metal and facilitating installations and removal of the water fences.

It is, therefore, a primary object of the invention to provide a mounting and support apparatus which allows horizontal adjustment of the water fence lengthwise of the tank.

Another object is the provision of such an apparatus which is easily adjusted in all three dimensions and capable of being locked in any selected position.

Other objects and advantages of the invention will become apparent during the course of the following description, when taken in connection with the accompanying drawings.

BRIEF DESCRIPTION OF THE DRAWINGS

In the accompanying drawings, wherein like numerals are employed to designate like parts throughout:

FIG. 1 is a longitudinal, vertical, sectional view through a conventional float glass producing device employing the invention;

FIG. 2 is a fragmentary plan view of the apparatus of FIG. 1, with the plenum chamber removed, illustrating the invention;

FIG. 5 is an enlarged, elevational view of the apparatus, partially in section, taken substantially along line 5—5 of FIG. 3.

DESCRIPTION OF THE PREFERRED EMBODIMENT

Figure 3:
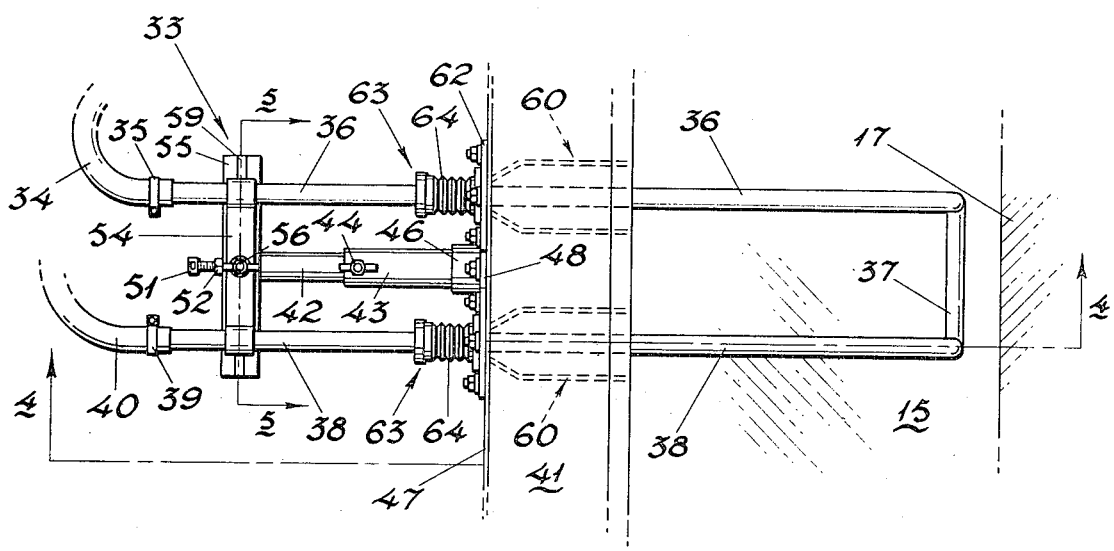
FIG. 3 is a fragmentary, enlarged plan view of one water fence shown in FIG. 2.

Referring now more particularly to the drawings, there is illustrated in FIGS. 1 and 2 a conventional float glass machine similar to that disclosed in the aforementioned U.S. Pat. No. 3,083,551. In the apparatus, molten glass 10 is supplied from the forehearth 11 of a glass melting furnace through and over a spout 12 in an amount regulated and controlled by a tweel 13 and a gate 14. The glass 10 flows from the spout 12 onto a bath of molten metal 15 (which may be tin or an alloy of tin) contained in a tank 16 to form a buoyant body of molten glass, indicated at 17 which develops into a buoyant layer of stable thickness at 18.

Above the molten metal bath 15 a closed headspace or plenum chamber 19 is defined by entry endwall 20, exit endwall 21, sidewalls 22 and roof 23 which, with extension 24, provide a structure for containing the protective float atmosphere (conventionally, a mixture of nitrogen and hydrogen) which is inert to both the molten metal of the bath and the glass and prevents contamination thereof by displacing oxygen or other reactive gases. To replace escaping gas and maintain the atmospheric integrity of the plenum chamber, float atmosphere is continually replenished from a source of supply through a main header 25 having branch ducts 26 which lead to a plurality of tank inlet ducts 27.

Within the tank 16, progressive controlled cooling of the glass takes place as it moves over the molten metal bath 15 toward the discharge end thereof. The stable or equilibrium layer 18 thereby hardens into the ultimate ribbon 28 which is sufficiently cooled to achieve a condition of stiffness which allows it to be transferred to an adjacent annealing lehr (not shown) by mechanical means without detriment to its surfaces. One such suitable mechanical means is illustrated in FIG. 1 by a series of spaced support rollers 29, 30 and 31 and superimposed roller 32. Any or all of the rollers may be driven by conventional means and cooperate to apply a tractive effort to the ribbon of glass sufficient to advance it along the bath. A ribbon of less than equilibrium thickness may be obtained by increasing the speed of the rollers 29 to 32, thereby modifying their tractive effort and attenuating the molten glass body 18 of stable thickness.

Figure 4:
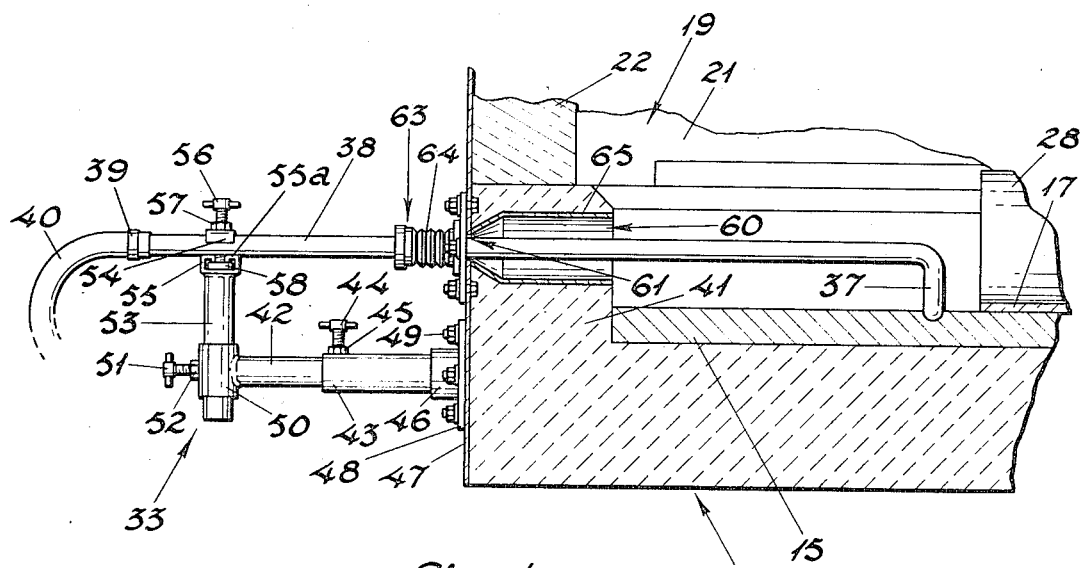
FIG. 4 is a vertical, sectional view taken substantially along line 4—4 of FIG. 3.

As illustrated in FIGS. 2-4, water fences 33 are positioned at spaced intervals along the tank 16. Each water fence comprises a section of tubing which in form resembles a hairpin having the closed end thereof bent downwardly such that it extends at approximately a right angle from the extended side members to form a U-shaped section. The heat absorbing medium (which may be water or other suitable liquids) is conducted from a source of supply through a flexible conduit 34 connected at 35 to an inlet conduit 36 of the water fence, flows through the inlet leg to a U-shaped section 37 which acts as the molten metal cooling heat exchanger, and continues through an outlet leg 38 which is connected at 39 to a return flexible conduit 40. If desired, the direction of flow can be reversed by switching conduits 34 and 40. The tube itself may be constructed of any suitable high temperature material such as stainless steel, for example.

The magnitude of the lateral force imparted to the ribbon of glass depends on the amount of localized cooling in the bath and the relative location of the cooled area with respect to the layer of glass 17. By increasing the cooling effect the localized lateral force thereon may be increased and, conversely, decreasing the cooling effect lessens this force.

The cooling effect may be modified by raising or lowering the U-shape segment 37 of the water fence 33 in the molten metal bath 15 thereby changing the heat exchange area and, thus, the amount of heat transfer between the tube segment and the molten metal. This may range from a minimum effect with the U-shaped section 37 positioned just above the bath to a maximum with the section 37 totally immersed in the molten metal. Of course, as will be hereinafter explained, the fence is mounted so that the section 37 can be raised well above the molten metal so as not to serve as an obstruction to foreign objects moving down the bath. Modification can also be accomplished by varying the amount and temperature of circulating coolant supplied to the water fence. This method may be objectionable, however, in that the coolant may overheat at lower flows forming undesirable vapor in the system.

Because the localized convection currents in the molten metal bath, which result from the cooling effect of the water fence, impart to the buoyant glass layer a lateral force which is quite narrow lengthwise of the bath, some adjustment in this direction as well as transversely and vertically is highly desirable. Such has been found to improve the flexibility of directional control over the advancing glass layer.

With the prior art devices, a particular example of which is illustrated in the aforementioned U. S. Pat. No. 3,223,503, the fence could be adjusted in and out along its longitudinal axis or moved vertically, but no provision existed for any horizontal adjustment lengthwise of the bath.

The present invention contemplates an improved supporting device rigidly attached to and, in turn, supported by the tank structure, which device allows horizontal pivotal motion of the water fence in addition to axial horizontal adjustment and vertical pivotal adjustment thereof.

To this end the basic structure of the invention comprises two horizontal and one vertical adjusting means (FIGS. 3-5). The structure is adjusted horizontally toward or away from the tank side wall 41 by means of a cantilevered outwardly extending, telescoping pipe member 42 which may be held rigidly at any desired position within a second cantilevered member 43 by a threaded clamping device 44 which operates through a threaded nut 45 fixed above a hole (not shown) in member 43 to bear against member 42. The cantilevered member 43 is threadedly attached to a matching pipe coupling 46 which may be rigidly secured to the side plate 47 of the casing as by welding or by means of a heavy plate 48 and bolts 49, and provides the mounting support for the structure of the invention.

The outward end of telescoping member 42 is welded or otherwise permanently attached to a sleeve 50 having threaded clamping means 51 which operates through a threaded nut 52 fixed above a hole (not shown) in sleeve 50 to bear against an upwardly extending telescoping member 53, the adjustment of which as hereinafter explained provides pivotal vertical positioning of the U-shaped cooling section 37.

In accordance with the illustrated embodiment of the invention, the spaced inlet and outlet legs of the water fence are positioned between a plate 54 and a member 55 carried by the telescoping member 53. A tightening device as a bolt 56 threaded through a nut 57 (secured to the plate 54) has a swivelled anchor plate 58 at its lower end. The member 55, positioned parallel to the side of the tank and welded or otherwise rigidly fastened to vertical member 53, is shaped substantially like a structural channel with the open side partially closed by wings 55a to form a slot 59 lengthwise of the member. This allows the bolt 56 and the anchor plate 58 to slide freely along the slot when the bolt is loosened while providing an upper surface against which the plate 58 may bear when the bolt 56 is tightened.

As best shown in FIGS. 3 and 4, the legs 36 and 38 extend through openings 60 in the sidewall 41, the inward portion of each being substantially larger than the legs to allow free pivotal motion about concentric openings 61 in the casing sideplate 47. A retaining plate 62 is mounted concentrically with each opening 61 and a suitable flexible atmosphere seal 63 is provided to prevent leakage of outside air into the chamber or loss of float atmosphere therefrom. Each seal includes a bellows arrangement 64 which absorbs axial expansion and contraction of the legs 36 and 38 and permits pivotal movement of the legs thereat. Each opening 60 has a retaining liner 65 which may be conically tapered through the outer portion of side wall 41 to minimize heat losses through and warpage of the casing structure. The legs 36 and 38, while remaining substantially sealed within the bellows 64, may slide axially therewithin to provide in and out adjustment of the fence.

The location of the outer ends of the inlet leg 36 and outlet leg 38 may be readily adjusted laterally along support member 55 allowing pivotal movement of the inlet and outlet legs of the water fence 33 to modify the location of the U-shaped cooling section 37 in the direction lengthwise of the tank. Thus, it will be readily apparent that the invention provides improved flexibility in positioning the water fence within the bath by allowing pivotal adjustment along the bath, and employs a minimum number of clamping devices which make the structure more desirable from the standpoint of ease and complete flexibility of adjustment, installation and disassembly.

I claim:

1. In apparatus for producing float glass including a tank containing a bath of molten metal on which the glass is floated in ribbon form, an enclosed chamber over said tank defined by a roof structure spanning spaced sidewalls and a fence characterized by spaced legs extending through one of said sidewalls and interconnected by a section adapted to be immersed in said molten metal bath along the edge of said ribbon of glass, an improved support means for said fence external to said tank structure comprising, in combination, a support member affixed to and projecting outwardly from said sidewall, said support member being adjustable in length with means fixing it at selected lengths, a vertical member extending upwardly from said support member, said vertical member being selectively movable up and down relative to said support member and movable toward and away from said sidewall with said support member, an elongated member affixed to said vertical member and extending substantially parallel to said tank and carrying said spaced legs thereon, and means clamping said spaced legs to said elongated member in selected positions therealong for longitudinally pivoting said fence about its point of passage through said sidewall to thereby provide three dimensional adjustment of the position of said fence.

2. Apparatus as claimed in claim 1, in which said clamping means includes a top horizontal member located above and disposed parallel to said elongated member, said spaced legs being received between said elongated member and top horizontal member.

3. Apparatus as claimed in claim 1, in which said elongated member is substantially channel shaped with inwardly directed wings depending from the flanges thereof forming a longitudinally extending top slot, and said clamping means includes a flat plate having an opening therethrough, a swivel plate slidably received within said top slot, a threaded bolt rotatably attached thereto and extending upwardly through said slot and said opening in said elongated member, and a locking nut carried by said elongated member through which said bolt is threaded.

4. Apparatus as claimed in claim 1, wherein said support member and said vertical member each comprise a tubular inner section telescopically received within a tubular outer section, and wherein the position fixing means for each comprises a nut fixed concentrically with an opening in said outer tubular section and a bolt threaded through said nut adapted, when tightened, to bear against said inner section and fix the relative positions of said telescoping sections.

* * * * *